(12) United States Patent
Menold

(10) Patent No.: US 10,851,519 B2
(45) Date of Patent: Dec. 1, 2020

(54) GUARD RAIL SYSTEM

(71) Applicant: Caterpillar Inc., Peoria, IL (US)

(72) Inventor: David Jordan Menold, Elmwood, IL (US)

(73) Assignee: Caterpillar Inc., Peoria, IL (US)

( * ) Notice: Subject to any disclaimer, the term of this patent is extended or adjusted under 35 U.S.C. 154(b) by 450 days.

(21) Appl. No.: 15/838,408

(22) Filed: Dec. 12, 2017

(65) Prior Publication Data

US 2019/0177951 A1 Jun. 13, 2019

(51) Int. Cl.
*E02F 9/08* (2006.01)
*F16B 2/06* (2006.01)
*B60R 3/00* (2006.01)

(52) U.S. Cl.
CPC ............ *E02F 9/0833* (2013.01); *B60R 3/005* (2013.01); *F16B 2/065* (2013.01)

(58) Field of Classification Search
CPC ... B60R 3/005; B62D 55/0845; E02F 9/0833; E04G 3/28; E04G 5/04; E04G 5/14; F16B 2/065; F16B 9/023; F16B 9/09
USPC ................................. 256/65.14, 69
See application file for complete search history.

(56) References Cited

U.S. PATENT DOCUMENTS

| | | | |
|---|---|---|---|
| 3,993,153 A | 11/1976 | Hansen et al. | |
| 4,060,268 A | 11/1977 | Page, Jr. | |
| 4,278,391 A | 7/1981 | Dagenais | |
| 5,096,270 A | 3/1992 | Oilund et al. | |
| 8,366,079 B2 * | 2/2013 | Stoffels | E01F 13/022 256/65.14 |
| 8,672,380 B2 * | 3/2014 | Carter | B60R 3/005 296/1.02 |
| 9,481,307 B2 * | 11/2016 | Koshy | E02F 9/0833 |
| 9,920,543 B2 * | 3/2018 | Budenbender | E04G 21/3219 |
| 2009/0178863 A1 | 7/2009 | Pink | |
| 2014/0217345 A1 * | 8/2014 | Stoffels | B60R 3/005 256/64 |
| 2016/0311376 A1 * | 10/2016 | Dokter | B60R 3/005 |

FOREIGN PATENT DOCUMENTS

| | | |
|---|---|---|
| DE | 8432331 | 4/1985 |
| DE | 4221140 | 1/1994 |
| GB | 1334016 | 10/1973 |
| NZ | 280022 | 4/1998 |
| RU | 155786 | 10/2015 |

* cited by examiner

*Primary Examiner* — Josh Skroupa
(74) *Attorney, Agent, or Firm* — Oblon, McClelland, Maier & Neustadt

(57) ABSTRACT

A guard rail system includes a bracket portion adapted to at least partially surround at least a portion of a track of a machine. The guard rail system includes at least one retention device provided in association with the bracket portion. The at least one retention device is adapted to removably affix the bracket portion to the portion of the track. The guard rail system also includes at least one receiving unit located on the bracket portion. The guard rail system further includes a rail member adapted to be removably affixed to the at least one receiving unit.

20 Claims, 5 Drawing Sheets

GUARD RAIL SYSTEM

TECHNICAL FIELD

The present disclosure relates to a guard rail system. More particularly, the present disclosure relates to the guard rail system for a tracked machine.

BACKGROUND

A tracked machine includes a pair of tracks to provide mobility to the machine, such as during travel, a work cycle, and the like. During a maintenance interval of the machine, an operator or a service personnel may be stationed on the track in order to access various service points on the machine. In some large machines, such as a track type tractor, an elevation of the track with respect to ground may be substantially high, thus, posing a safety hazard for the operator. Also, it may be difficult to move around on the track due to an uneven surface of the track, presence of service equipment on and/or around the track, such as tools, hoses, and the like, in turn, posing a tripping hazard.

U.S. Pat. No. 3,993,153 describes a bottom guard arrangement for a track-type vehicle. The guard arrangement includes a front guard detachably secured to a frame extending between a pair of track assemblies. The guard arrangement also includes a rear guard detachably secured to the frame. The guard arrangement further includes an intermediate guard detachably secured to each of the front guard and the rear guard.

The '153 patent provides the guard arrangement in order to limit damage to components of the track-type vehicle, such as a crankcase and a transmission unit. However, the '153 patent does not provide a system and/or a means to provide a protection system for the operator present on the track. Hence, there is a need for an improved protection system for the operator.

SUMMARY OF THE DISCLOSURE

In an aspect of the present disclosure, a guard rail system is provided. The guard rail system includes a bracket portion adapted to at least partially surround at least a portion of a track of a machine. The guard rail system includes at least one retention device provided in association with the bracket portion. The at least one retention device is adapted to removably affix the bracket portion to the portion of the track. The guard rail system also includes at least one receiving unit located on the bracket portion. The guard rail system further includes a rail member adapted to be removably affixed to the at least one receiving unit.

In another aspect of the present disclosure, a clamp mechanism for a guard rail system is provided. The clamp mechanism includes a bracket portion adapted to at least partially surround at least a portion of a track of a machine. The clamp mechanism also includes at least one retention device provided in association with the bracket portion. The at least one retention device is adapted to removably affix the bracket portion to the portion of the track. The clamp mechanism further includes at least one receiving unit located on the bracket portion. The at least one receiving unit is adapted to removably affix a rail member to the bracket portion.

In yet another aspect of the present disclosure, a method of mounting a guard rail system is provided. The method includes slidably mounting a first bracket portion on a portion of a track of a machine. The method includes removably affixing the first bracket portion to the portion of the track. The method includes mounting at least one receiving unit on the first bracket portion. The method includes slidably mounting a second bracket portion on another portion of the track. The second bracket portion is located spaced apart with respect to the first bracket portion. The method includes removably affixing the second bracket portion to the another portion of the track. The method also includes mounting at least one receiving unit on the second bracket portion. The method further includes removably affixing a rail member to each of the at least one receiving units of the first bracket portion and the second bracket portion respectively.

Other features and aspects of this disclosure will be apparent from the following description and the accompanying drawings.

DETAILED DESCRIPTION

Figure 1:
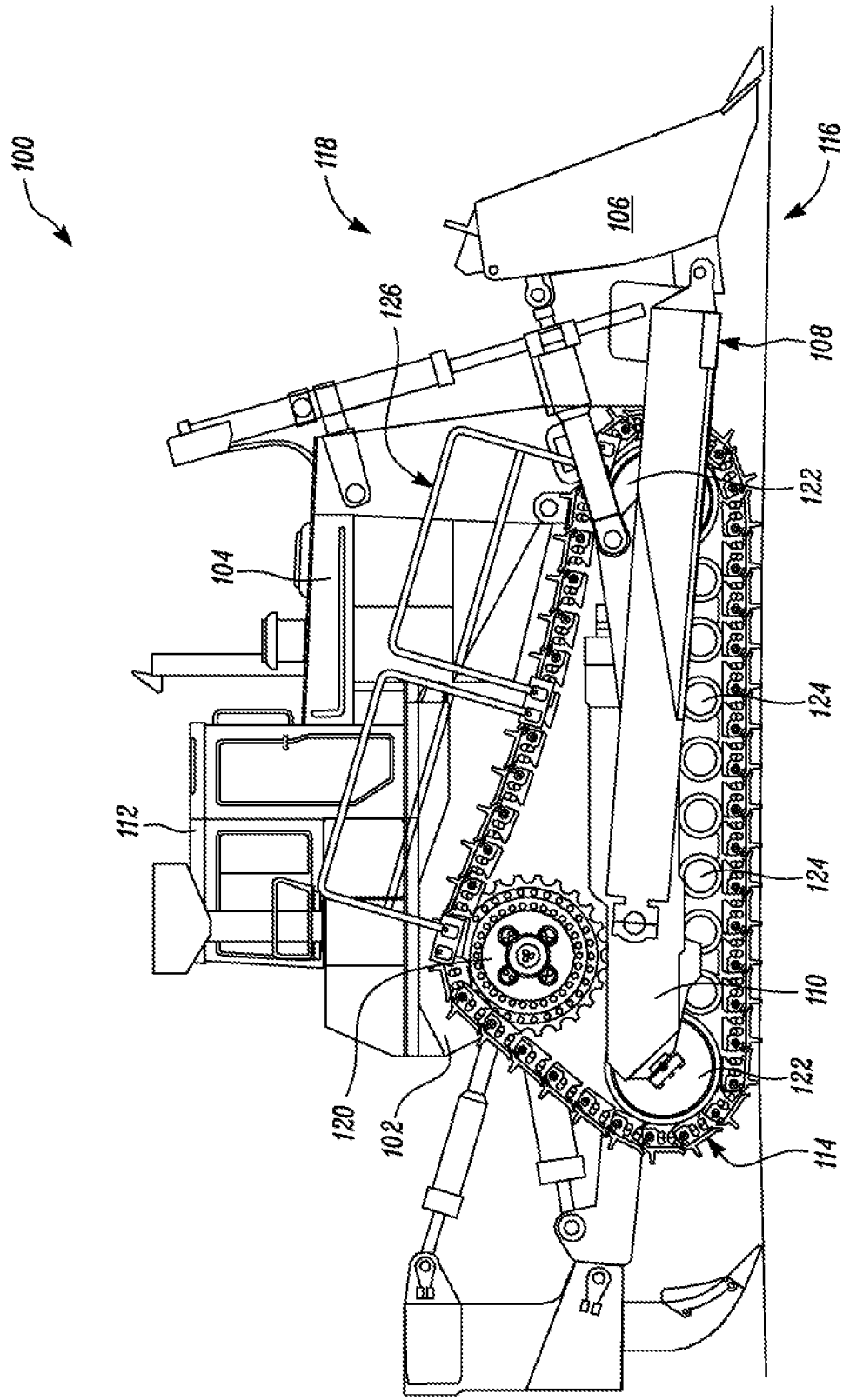
FIG. 1 is a side view of an exemplary machine, according to an embodiment of the present disclosure.

Wherever possible, the same reference numbers will be used throughout the drawings to refer to the same or the like parts. Referring to FIG. 1, an exemplary machine 100 is illustrated. More specifically, in the illustrated embodiment, the machine 100 comprises a track type tractor. In other embodiments, the machine 100 may comprise any machine, such as a hydraulic excavator, an electric rope shovel, or any other machine which may move utilizing tracks. The machine 100 may be associated with any industry including, but not limited to, construction, mining, agriculture, and material handling. The machine 100 may perform tasks including earth moving, demolishment, and material handling.

The machine 100 includes a frame 102. The frame 102 supports one or more components of the machine 100. The machine 100 includes an enclosure 104 provided on the frame 102. The enclosure 104 encloses a power source (not shown) mounted on the frame 102. The power source may be one or more of an internal combustion engine, batteries, motor. The power source may provide power to the machine 100 for mobility and operational requirements.

The machine 100 includes an implement such as a blade 106. The blade 106 may perform tasks, such as earth moving, and demolishment, based on application requirements. The machine 100 also includes an arm assembly 108. The arm assembly 108 mounts the blade 106 to the frame 102 of the machine 100. More specifically, the arm assembly 108 movably couples the blade 106 to a first track roller frame 110 of the machine 100. The arm assembly 108 is adapted to vary a distance of the blade 106 with respect to ground, based on operational requirements.

The machine 100 includes an operator cabin 112 mounted on the frame 102. The operator cabin 112 may house various controls (not shown) of the machine 100. The controls may include a steering, a control console, joysticks, levers, pedals, switches, knobs, buttons, and audio visual devices. The controls may enable an operator (not shown) to control the machine 100 on the ground. The machine 100 also includes a first track 114 and a second track (not shown) provided on a first side 116 and a second side 118 of the machine 100 respectively.

The first track 114 is mounted to the frame 102 via one or more components, such as the first track roller frame 110, a first sprocket 120, first driven wheels 122, and first auxiliary wheels 124. Similarly, the second track is mounted to the frame 102 via one or more components (not shown), such as a second track roller frame, a second sprocket, second driven wheels, and second auxiliary wheels. Each of the first track 114 and the second track is adapted to support and provide mobility to the machine 100 on the ground.

Figure 2:
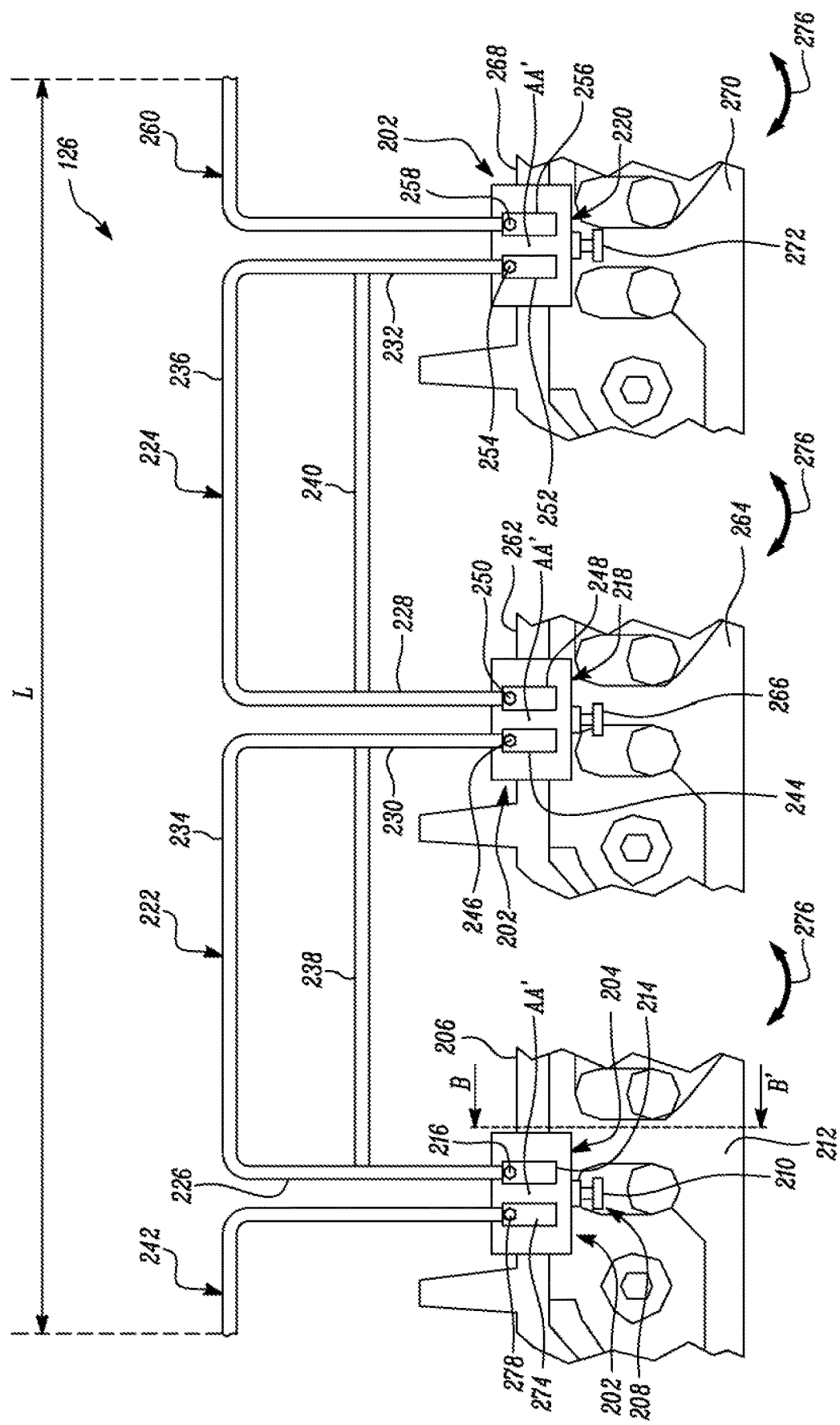
FIG. 2 is a side view of a guard rail system installed on a portion of the machine of FIG. 1, according to an embodiment of the present disclosure.

The machine 100 also includes a guard rail system 126 mounted on the machine 100. More specifically, the guard rail system 126 is adapted to be mounted on a portion of the machine 100, such as the first track 114 and/or the second track. Referring to FIG. 2, an enlarged side view of the guard rail system 126 mounted on the first track 114 of the machine 100 is illustrated. It should be noted that, in the illustrated embodiment, three track pads and associated track links are shown for the purpose of clarity and explanation, such as a track pad 206 and an associated track link 212, a track pad 262 and an associated track link 264, and a track pad 268 and an associated track link 270. As such, the first track 114 may include one or more additional track pads (not shown) and associated additional track links (not shown) between each of the track pads 206, 262, 268. The guard rail system 126 includes a clamp mechanism 202. The clamp mechanism 202 includes one or more bracket portions, such as a first bracket portion 204, a second bracket portion 218, and a third bracket portion 220. The bracket portion will now be described with reference to the first bracket portion 204.

It should be noted that a configuration, design, dimension, and/or material of construction of each of the second bracket portion 218 and the third bracket portion 220 is similar to a configuration, design, dimension, and/or material of construction of the first bracket portion 204 respectively. Also, in other embodiments, the guard rail system 126 may include single or multiple bracket portions, such as more than three, based on application requirements. The first bracket portion 204 is adapted to at least partially surround a portion of the first track 114, such as the track pad 206. The first bracket portion 204 is also adapted to be coupled to the first track 114, such as the track pad 206 and/or the track link 212 associated with the track pad 206.

Figure 3:
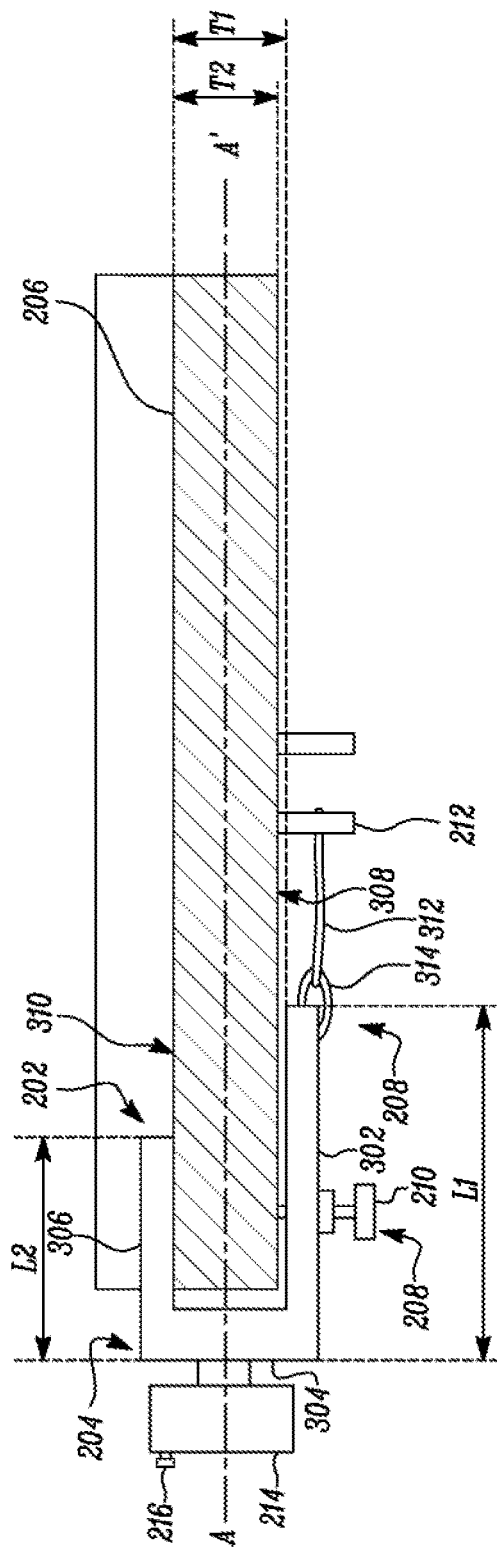
FIG. 3 is a front cross-sectional view of a clamp mechanism of the guard rail system along a section B-B' shown in FIG. 2, according to an embodiment of the present disclosure.
Figure 4:
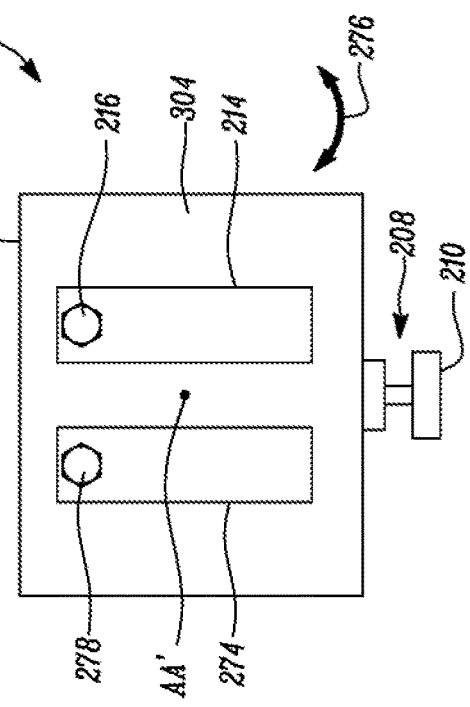
FIG. 4 is a side view of the clamp mechanism of FIG. 3, according to an embodiment of the present disclosure.
Figure 5:
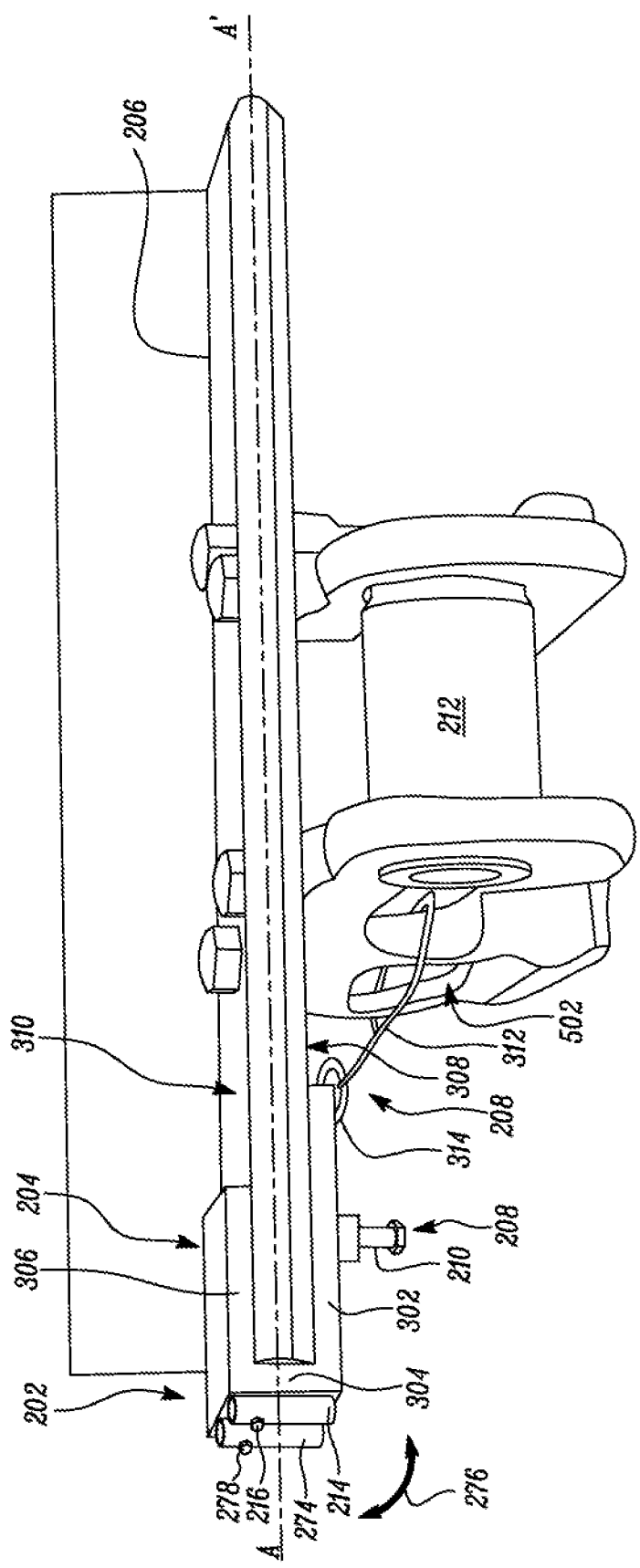
FIG. 5 is a perspective view of the clamp mechanism of FIG. 3 installed on the portion of the machine of FIG. 1, according to an embodiment of the present disclosure.

FIG. 3 illustrates a front cross-sectional view of the first bracket portion 204 along a section B-B' shown in FIG. 2. FIG. 4 illustrates a side view of the first bracket portion 204 mounted on the track pad 206. FIG. 5 illustrates a perspective view of the first bracket portion 204 mounted on the track pad 206. Referring to FIGS. 3 and 5, the first bracket portion 204 defines an axis A-A' (also shown in FIG. 2). The first bracket portion 204 includes a first section 302, a second section 304, and a third section 306. Each of the first section 302, the second section 304, and the third section 306 is interconnected to one another, such that the first bracket portion 204 includes a substantially C-shaped configuration. Accordingly, each of the first section 302, the second section 304, and the third section 306 is adapted to be slidably mounted on the portion of the first track 114.

More specifically, the first section 302 is substantially parallel and spaced apart with respect to the third section 306 and the axis A-A'. Also, the second section 304 is substantially perpendicular with respect to each of the first section 302, the third section 306, and the axis A-A'. Also, the second section 304 is connected to each of the first section 302 and the third section 306. The first section 302 defines a length "L1" and is adapted to at least partially contact a lower surface 308 of the track pad 206. The third section 306 defines a length "L2" and is adapted to at least partially contact an upper surface 310 of the track pad 206.

In the illustrated embodiment, the length "L2" of the third section 306 is substantially smaller than the length "L1" of the first section 302. In other embodiments, the length "L2" of the third section 306 may be equal to or greater than the length "L1" of the first section 302. Also, the first bracket portion 204 includes an inner thickness "T1" defined between the first section 302 and the third section 306. The track pad 206 defines a thickness "T2". In the illustrated embodiment, the inner thickness "T1" of the first bracket portion 204 is approximately equal to the thickness "T2" of the track pad 206. In other embodiments, the inner thickness "T1" of the first bracket portion 204 may be greater than the thickness "T2" of the track pad 206.

Referring to FIG. 2, the clamp mechanism 202 also includes one or more retention devices 208 provided on the first bracket portion 204. The retention device 208 will now be described with reference to the first bracket portion 204. It should be noted that additional retention devices similar to the retention devices 208 may be employed with each of the second bracket portion 218 and the third bracket portion 220 respectively.

Referring to FIGS. 3, 4, and 5, the retention device 208 includes a primary retainer 210 provided in association with the first section 302. In the illustrated embodiment, the primary retainer 210 is a bolt adapted to interlock with the lower surface 308 of the track pad 206. In other embodiments, the primary retainer 210 may be any other fastener, such as a screw, a clip, a clamp, or a pin, based on application requirements. Accordingly, the primary retainer 210 is adapted to removably affix the first bracket portion 204 with respect to the track pad 206. For example, when the first bracket portion 204 may be mounted on the track pad 206 during installation of the guard rail system 126, the primary retainer 210 may be engaged with the track pad 206 to affix the first bracket portion 204 with respect to the track pad 206. During removal of the guard rail system 126, the primary retainer 210 may be disengaged with respect to the track pad 206 to remove the first bracket portion 204 from the track pad 206.

Additionally, referring to FIGS. 3 and 5, the retention device 208 also includes a connector link 312 provided in association with the first section 302. In the illustrated embodiment, the connector link 312 is a cable adapted to connect the first bracket portion 204 with the track link 212 associated with the track pad 206. More specifically, one end of the connector link 312 may be connected to a connector loop 314 provided on the first section 302 of the first bracket portion 204, and another end of the connector link 312 may be connected to the track link 212 by passing the another end via one or more apertures 502 (shown in FIG. 5) of the track link 212. In other embodiments, the connector link 312 may be connected to any other surface of the first track 114 or the machine 100, based on application requirements. In other embodiments, the connector link 312 may be a strap, a belt, a chain link, or a tether, based on application requirements. The connector link 312 is adapted to provide a secondary retainer, in combination with the primary retainer 210, in order to removably affix the first bracket portion 204 with respect to the track pad 206.

Referring to FIG. 2, the clamp mechanism 202 also includes one or more receiving units 214, 274 provided on the first bracket portion 204. The receiving units 214, 274 will now be described with reference to the first bracket portion 204. It should be noted that additional receiving units 244, 248, 252, 256 similar to the receiving units 214, 274 may be employed with each of the second bracket portion 218 and the third bracket portion 220 respectively.

More specifically, referring to FIGS. 2 to 5, in the illustrated embodiment, each of the receiving units 214, 274 is located on the second section 304 of the first bracket portion 204. In other embodiments, the one or more receiving units 214, 274 may be alternatively provided on any other section of the first bracket portion 204, such as the third section 306. Each of the receiving units 214, 274 is pivotally mounted on the first bracket portion 204. Accordingly, each of the receiving units 214, 274 is adapted to pivot around the axis A-A' in a direction 276.

Each of the receiving units 214, 274 includes a substantially tubular configuration. In the illustrated embodiment, each of the receiving units 214, 274 includes a substantially cylindrical configuration. In other embodiments, the one or more receiving units 214, 274 may include any other tubular configuration, such as a rectangular configuration. The clamp mechanism 202 further includes one or more fastening elements 216, 278 provided in association with each of the receiving units 214, 274 respectively. Each of the fastening elements 216, 278 may be any fastener, such as a bolt, a screw, a pin, or a clamp.

Referring to FIG. 2, the guard rail system 126 further includes one or more rail members 222, 224. In other embodiments, the guard rail system 126 may include single or multiple rail members based on an overall length "L" of the guard rail system 126. Each of the rail members 222, 224 includes a first leg 226, 228 and a second leg 230, 232 respectively. Each of the rail members 222, 224 also includes a support member 234, 236 connecting the first leg 226, 228 and the second leg 230, 232 respectively.

Additionally, or optionally, each of the rail members 222, 224 further includes an auxiliary member 238, 240 connecting the first leg 226, 228 and the second leg 230, 232 respectively. The auxiliary member 238, 240 is substantially parallel with respect to the support member 234, 236 respectively. Each of the rail members 222, 224 includes a substantially tubular configuration. In the illustrated embodiment, each of the rail members 222, 224 includes a substantially cylindrical configuration. In other embodiments, the one or more rail members 222, 224 may include any other tubular configuration, such as a rectangular configuration.

The guard rail system 126 includes the second bracket portion 218 and the third bracket portion 220. Each of the second bracket portion 218 and the third bracket portion 220 is removably affixed on the portion of the first track 114 in a manner similar to the first bracket portion 204. Also, each of the first bracket portion 204, the second bracket portion 218, and the third bracket portion 220 is located spaced apart with respect to one another.

Further, the rail members 222, 224 are removably affixed with respect to the first bracket portion 204, the second bracket portion 218, and the third bracket portion 220. More specifically, the first leg 226 of the rail member 222 is removably affixed with respect to the receiving unit 214 of the first bracket portion 204 via the fastening element 216. Also, the receiving unit 274 of the first bracket portion 204 may be removably affixed with respect to an adjacent rail member 242 via the fastening element 278. Further, the second leg 230 of the rail member 222 is removably affixed with respect to a receiving unit 244 of the second bracket portion 218 via a fastening element 246.

Additionally, the first leg 228 of the rail member 224 is removably affixed with respect to a receiving unit 248 of the second bracket portion 218 via a fastening element 250. Further, the second leg 232 of the rail member 224 is removably affixed with respect to a receiving unit 252 of the third bracket portion 220 via a fastening element 254. Also, the receiving unit 256 of the third bracket portion 220 may be removably affixed with respect to an adjacent rail member 260 via a fastening element 258. In such a manner, the guard rail system 126 may include multiple rail members provided in association with the first track 114 and/or the second track by using multiple bracket portions in order to increase the overall length "L" of the guard rail system 126.

INDUSTRIAL APPLICABILITY

Figure 6:
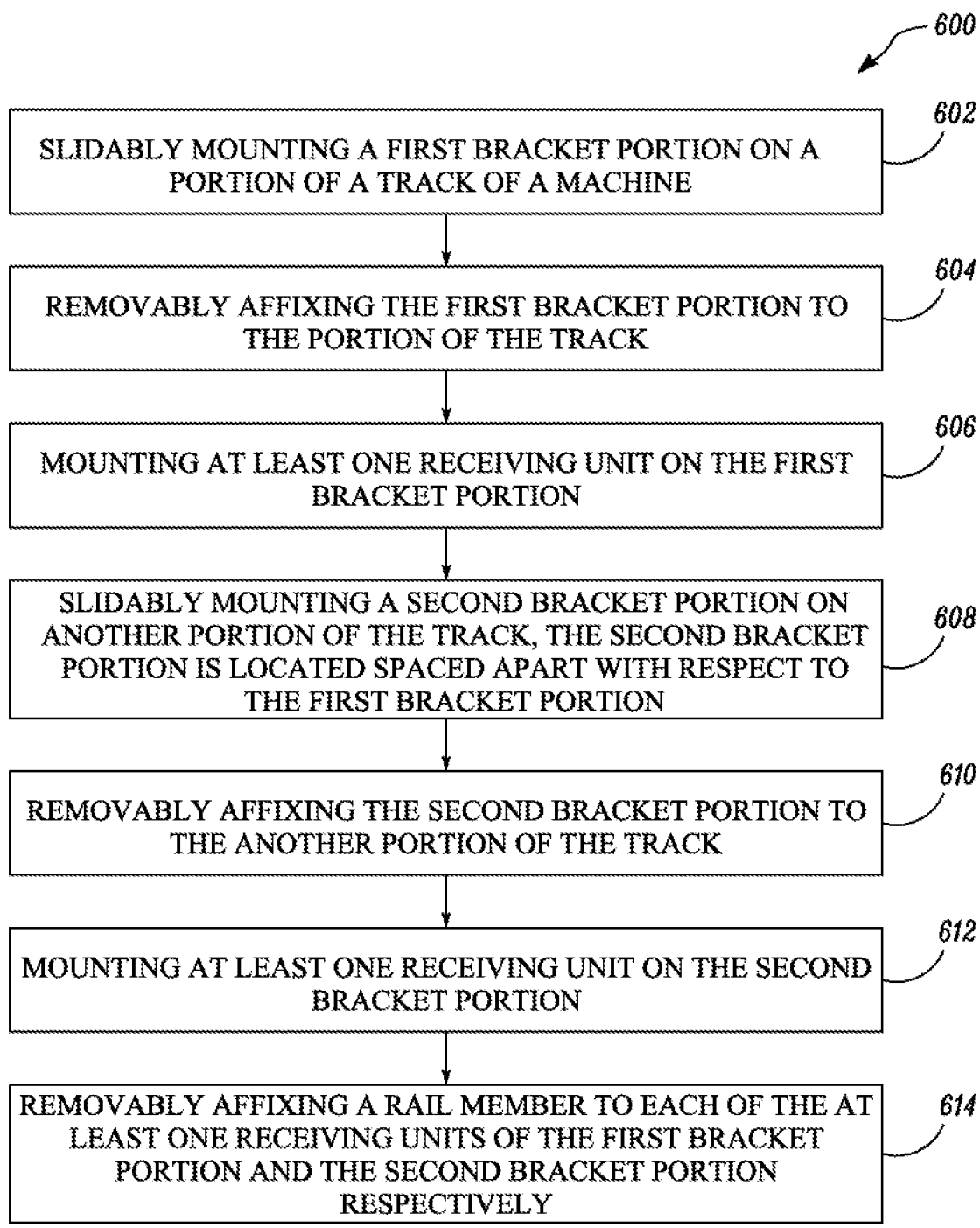
FIG. 6 is a flowchart illustrating a method of mounting the guard rail system, according to an embodiment of the present disclosure.

The present disclosure relates to a method 600 of mounting the guard rail system 126 on a track associated with the machine 100. Referring to FIG. 6, a flowchart of the method 600 is illustrated. The method 600 will be now described in relation to the first track 114 and with continued reference to FIG. 2. It should be noted that the guard rail system 126 may be similarly mounted on the second track of the machine 100. At step 602, the first bracket portion 204 is slidably mounted on the portion of the first track 114. More specifically, the first bracket portion 204 is slidably mounted on the track pad 206 of the first track 114.

At step 604, the first bracket portion 204 is removably affixed to the portion of the first track 114. More specifically, the first bracket portion 204 is removably affixed to the track pad 206 and/or the track link 212 using the retention device 208, such as the primary retainer 210 and/or the connector link 312 (shown in FIGS. 3 and 5) respectively. The primary retainer 210 may be the bolt, the screw, the clip, the clamp, or the pin, based on application requirements. The connector link 312 (shown in FIGS. 3 and 5) may be the strap, the belt, the cable, or the tether, based on application requirements. At step 606, one or more receiving units 214, 274 are mounted on the first bracket portion 204. In some embodiments, the receiving units 214, 274 may be integrally formed along with the first bracket portion 204 during manufacture of the first bracket portion 204.

At step 608, the second bracket portion 218 is slidably mounted on another portion of the first track 114. More specifically, the second bracket portion 218 is slidably mounted on another track pad 262 of the first track 114. The second bracket portion 218 is located on the portion of the first track 114 spaced apart with respect to the first bracket portion 204. At step 610, the second bracket portion 218 is removably affixed to the another portion of the first track 114. More specifically, the second bracket portion 218 is removably affixed to the track pad 262 and/or the track link 264 associated with the track pad 262 using the retention device, such as a primary retainer 266 and/or a connector link (not shown) respectively.

At step 612, one or more receiving units 244, 248 are mounted on the second bracket portion 218. In some embodiments, the receiving units 244, 248 may be integrally formed along with the second bracket portion 218 during manufacture of the second bracket portion 218. At step 614, the rail member 222 is removably affixed to each of the receiving units 214, 244 of the first bracket portion 204 and the second bracket portion 218 respectively. More specifically, the first leg 226 of the rail member 222 is affixed to the receiving unit 214 of the first bracket portion 204, and the second leg 230 of the rail member 222 is affixed to the receiving unit 244 of the second bracket portion 218. The rail member 222 is removably affixed to the receiving units 214, 244 of the first bracket portion 204 and the second bracket portion 218 using the fastening elements 216, 246 respectively.

Additionally, based on the overall length "L" of the guard rail system 126, the third bracket portion 220 may be slidably mounted on another track pad 268 of the first track 114. The third bracket portion 220 may be removably affixed to the track pad 268 and/or the track link 270 associated with the track pad 268 using the retention device, such as a primary retainer 272 and/or a connector link (not shown) respectively. Further, the rail member 224 may be removably affixed in the receiving unit 248 of the second bracket portion 218 and the receiving unit 252 of the third bracket portion 220. The rail member 224 may be affixed in the receiving units 248, 252 using the fastening elements 250, 254 respectively. Similarly, additional bracket portions (not shown) and additional rail members 242. 260 may be provided in order to increase the overall length "L" of the guard rail system 126.

The guard rail system 126 provides a simple, efficient, and cost-effective method to provide protection for the operator or service personnel present on the first track 114 and/or the second track. The guard rail system 126 includes simple, commonly available, and easy to use components, such as the rail members 222, 224, 242, 260 and the clamp mechanism 202 that may be easily installed on the machine 100 and may be secured on the first track 114 and/or the second track using the retention devices 208. As such, the guard rail system 126 may be installed on the machine 100 as and when required with minimum effort and minimum setup time.

After use, the guard rail system 126 may be easily dismantled and stored in limited space, thus, improving portability and usability. Also, the receiving units 214, 274, 244, 248, 252, 256 may compensate for any sag present in the first track 114 and/or the second track in order to align the guard rail system 126 in a desired position, in turn, providing improved stability to the guard rail system 126. For example, during sag in a portion of the first track 114, such as between the track pad 206 and the track pad 262, the receiving units 214, 244 may independently pivot in the direction 276 in order to maintain the desired position of the rail member 222. Further, the guard rail system 126 may be installed on any tracked machine with little or no modification to the existing system.

While aspects of the present disclosure have been particularly shown and described with reference to the embodiments above, it will be understood by those skilled in the art that various additional embodiments may be contemplated by the modification of the disclosed machines, guard rail systems and methods without departing from the spirit and scope of the disclosure. Such embodiments should be understood to fall within the scope of the present disclosure as determined based upon the claims and any equivalents thereof.

What is claimed is:

1. A guard rail system comprising:
   a bracket portion adapted to at least partially surround at least a portion of a track of a machine;
   at least one retention device provided in association with the bracket portion, the at least one retention device adapted to removably affix the bracket portion to the portion of the track;
   at least one receiving unit located on an external wall of a second section of the bracket portion opposite an internal wall of the second section adapted to be adjacent the portion of the track when the bracket portion at least partially surrounds at least the portion of the track; and
   a guard rail member removably affixed to the at least one receiving unit.

2. The guard rail system of claim 1, wherein the bracket portion comprises a substantially C-shaped configuration.

3. The guard rail system of claim 1,
   wherein the at least one retention device includes a first section, the second section, and a third section,
   wherein the first section and the third section are spaced from each other by a predetermined thickness and extend parallel to each other,
   wherein the first section has a length greater than a length of the third section, and
   wherein the second section connects the first section to the third section.

4. The guard rail system of claim 1, wherein the at least one retention device comprises at least one of a strap, a screw, or a bolt.

5. The guard rail system of claim 1, wherein the at least one retention device comprises at least one connector link, the at least one connector link adapted to be removably coupled to the portion of the track.

6. The guard rail system of claim 1, wherein the at least one receiving unit is pivotally mounted on the bracket portion.

7. The guard rail system of claim 1, wherein the at least one receiving unit comprises a plurality of receiving units, each of the plurality of receiving units adapted to be removably affixed to adjacent guard rail members.

8. The guard rail system of claim 1, wherein the at least one receiving unit comprises at least one fastening element, the at least one fastening element adapted to removably affix the guard rail member to the at least one receiving unit such that the guard rail member extends parallel to the external wall of the second section of the bracket portion.

9. A clamp mechanism for a guard rail system, the clamp mechanism comprising:
   a bracket portion adapted to at least partially surround at least a portion of a track of a machine;
   at least one retention device provided in association with the bracket portion, the at least one retention device adapted to removably affix the bracket portion to the portion of the track; and
   at least one receiving unit located on an external wall of a second section of the bracket portion opposite an internal wall of the second section adapted to be adjacent the portion of the track when the bracket portion at least partially surrounds at least the portion of the track, the at least one receiving unit adapted to removably affix a guard rail member to the bracket portion.

10. The clamp mechanism of claim 9, wherein the bracket portion comprises a substantially C-shaped configuration.

11. The clamp mechanism of claim 9,
wherein the at least one retention device includes a first section, the second section, and a third section,
wherein the first section and the third section are spaced from each other by a predetermined thickness and extend parallel to each other,
wherein the second section connects the first section to the third section, and
wherein the at least one receiving unit extends from the external wall of the second section and has a central longitudinal axis that is parallel to the external wall of the second section.

12. The clamp mechanism of claim 9, wherein the at least one retention device comprises at least one of a strap, a screw, or a bolt.

13. The clamp mechanism of claim 9, wherein the at least one retention device comprises at least one connector link, the at least one connector link adapted to be removably coupled to the portion of the track.

14. The clamp mechanism of claim 9, wherein the at least one receiving unit is pivotally mounted on the bracket portion.

15. The clamp mechanism of claim 9, wherein the at least one receiving unit comprises a plurality of receiving units, each of the plurality of receiving units adapted to be removably affixed to adjacent guard rail members.

16. The clamp mechanism of claim 9, wherein the at least one receiving unit comprises at least one fastening element, the at least one fastening element adapted to removably affix the guard rail member to the at least one receiving unit.

17. A method of mounting a guard rail system, the method comprising:
slidably mounting a first bracket portion on a portion of a track of a machine;
removably affixing the first bracket portion to the portion of the track;
mounting at least one receiving unit on the first bracket portion;
slidably mounting a second bracket portion on another portion of the track, the second bracket portion located spaced apart with respect to the first bracket portion;
removably affixing the second bracket portion to the another portion of the track;
mounting at least one receiving unit on the second bracket portion; and
after said removably affixing the first and second bracket portions to the portion and the another portion of the track, respectively, removably affixing a guard rail member to each of the at least one receiving units of the first bracket portion and the second bracket portion respectively.

18. The method of claim 17, wherein the first bracket portion is removably affixed to the portion of the track using at least one of a screw, a bolt, a strap, or a connector link.

19. The method of claim 17, wherein the second bracket portion is removably affixed to the another portion of the track using at least one of a screw, a bolt, a strap, or a connector link.

20. The method of claim 17, wherein the guard rail member is removably affixed to each of the at least one receiving units using a fastening element.

* * * * *